US008606055B2

(12) United States Patent
Lipson et al.

(10) Patent No.: US 8,606,055 B2
(45) Date of Patent: Dec. 10, 2013

(54) PIN DIODE TUNED MULTIPLE RING WAVEGUIDE RESONANT OPTICAL CAVITY SWITCH AND METHOD

(75) Inventors: Michal Lipson, Ithaca, NY (US); Sasikanth Manipatruni, Niskayuna, NY (US); Hugo Leonardo Rocha de Lira, Ithaca, NY (US)

(73) Assignee: Cornell University, Ithaca, NY (US)

( * ) Notice: Subject to any disclaimer, the term of this patent is extended or adjusted under 35 U.S.C. 154(b) by 380 days.

(21) Appl. No.: 12/939,482

(22) Filed: Nov. 4, 2010

(65) Prior Publication Data

US 2011/0170821 A1     Jul. 14, 2011

Related U.S. Application Data

(60) Provisional application No. 61/258,938, filed on Nov. 6, 2009.

(51) Int. Cl.
*G02B 6/26* (2006.01)
*G02F 1/25* (2006.01)

(52) U.S. Cl.
USPC ............... 385/2; 385/16; 385/39; 385/50

(58) Field of Classification Search
None
See application file for complete search history.

(56) References Cited

U.S. PATENT DOCUMENTS

| | | | |
|---|---|---|---|
| 6,052,495 A | 4/2000 | Little | |
| 6,195,187 B1 * | 2/2001 | Soref et al. | 398/9 |
| 6,341,184 B1 * | 1/2002 | Ho et al. | 385/3 |
| 6,411,756 B2 | 6/2002 | Sadot et al. | |
| 6,965,128 B2 | 11/2005 | Holm et al. | |
| 7,120,338 B2 | 10/2006 | Gunn, III | |
| 7,231,113 B2 | 6/2007 | Chu et al. | |
| 7,421,168 B1 | 9/2008 | Goutzoulis | |
| 7,466,881 B1 | 12/2008 | Fattal et al. | |
| 7,489,439 B2 | 2/2009 | Kuo et al. | |
| 7,616,850 B1 | 11/2009 | Watts et al. | |
| 7,639,910 B2 | 12/2009 | Yamazaki et al. | |
| 7,751,654 B2 | 7/2010 | Lipson et al. | |
| 2005/0175356 A1 | 8/2005 | McCallion et al. | |
| 2007/0110453 A1 | 5/2007 | Akiyama et al. | |
| 2008/0031296 A1 * | 2/2008 | Spillane et al. | 372/45.01 |
| 2008/0063339 A1 * | 3/2008 | Spillane et al. | 385/14 |
| 2009/0078963 A1 | 3/2009 | Khodja | |

(Continued)

OTHER PUBLICATIONS

Q. Xu et al. Cascaded silicon micro-ring modulators for WDM optical interconnection. Optics Express, 14:20:9431-9436, Oct. 2006.*

(Continued)

*Primary Examiner* — Mike Stahl
(74) *Attorney, Agent, or Firm* — William Greener; Bond, Schoeneck & King PLLC

(57) ABSTRACT

An optical switch structure and a method for fabricating the optical switch structure provide at least two ring waveguides located and formed supported over a substrate. At least one of the at least two ring waveguides includes at least one PIN diode integral with the ring waveguide as a tuning component for an optical switch device that derives from the optical switch structure. The PIN diode includes different doped silicon slab regions internal to and external to the ring waveguide, and an intrinsic region there between that includes the ring waveguide. The method uses two photolithographic process steps, and also preferably a silicon-on-insulator substrate, to provide the ring waveguides formed of a monocrystalline silicon semiconductor material.

12 Claims, 15 Drawing Sheets

(56) References Cited

U.S. PATENT DOCUMENTS

| | | |
|---|---|---|
| 2009/0169149 A1 | 7/2009 | Block |
| 2009/0263078 A1* | 10/2009 | Hosomi et al. ................ 385/14 |
| 2009/0304327 A1 | 12/2009 | Green et al. |
| 2010/0209038 A1 | 8/2010 | Popovic et al. |
| 2011/0058765 A1* | 3/2011 | Xu .................................. 385/2 |
| 2011/0069963 A1* | 3/2011 | McLaren et al. ............. 398/115 |

OTHER PUBLICATIONS

Apollo Photonics; APSS Apollo Application Note on Micro Ring Resonator—Computer-Aided Design and Simulation—APN-APSS-RingResonator; 2003 Apollo Inc.; pp. 1-24.

* cited by examiner

PIN DIODE TUNED MULTIPLE RING WAVEGUIDE RESONANT OPTICAL CAVITY SWITCH AND METHOD

RELATED APPLICATION DATA

The instant application claims priority to U.S. Provisional application Ser. No. 61/258,938 filed on Nov. 6, 2009, the subject matter of which is incorporated herein by reference in its entirety.

GOVERNMENT SPONSORSHIP

The disclosed subject matter was sponsored by the Army Research Office (ARO) under contract ID W911NF-06-1-0057, by the National Science Foundation CAREER Grant under contract IDs 0446571 and 0347649, and the Army Research Laboratory (ARL) under contract ID W911NF-07-1-0652. The government has certain rights in the invention.

BACKGROUND

1. Field of the Invention

Embodiments of the invention relate generally to optical switches. More particularly, embodiments of the invention relate to enhanced performance optical switches and methods associated therewith.

2. Description of the Related Art

Optical switches are integral components for on-chip optical networks. Generally, optical switches are essential for high performance optical interconnects in multi-core microprocessor systems, where large bandwidth densities, low energy consumption and small footprint components are desirable. More particularly, within optical networks a broadband optical switch desirably provides at least: (1) a low distortion of a high bandwidth signal; and (2) a robustness of an optical signal from an on chip temperature change.

Hitless tuning of an optical switch, i.e., switching data at one wavelength of the optical switch without affecting the other data wavelengths in an interconnect that utilizes the optical switch, is also an important criterion for on-chip optical networks employing multiple wavelengths. Particular characteristics of hitless tuning are defined in FIG. 1, wherein an OFF position of an optical switch a specific data transmission wavelength from a group of data transmission wavelengths is separated to a drop port, while in an ON position of the optical switch the specific data transmission wavelength from the group of data transmission wavelengths remains with the group of data transmission wavelengths.

Desirable within broadband optical networks are optical switch structures and methods for fabrication of those optical switch structures that provide for efficient hitless tuning of optical switch devices that derive from optical operation of the optical switch structures.

SUMMARY

The embodiments include an optical switch structure that may be used within an on-chip optical network and a related optical switch network that includes the optical switch structure, as well as a method for fabricating the optical switch structure that may be used within the on-chip optical network. The particular optical switch structure and related method in accordance with the embodiments provides a multiple ring waveguide resonant optical cavity structure that includes at least two ring waveguides, where at least one of the at least two ring waveguides includes as a tuning component a PIN (i.e., p-doped/intrinsic/n-doped) diode that is integral with the at least one of the at least two ring waveguides.

The optical switch structure in accordance with the embodiments and the method for fabricating the optical switch structure in accordance with the embodiments provides a hitless electro-optical switch structure that may be fabricated using a semiconductor-on-insulator substrate that is processed using generally conventional semiconductor processing methodology.

A particular optical switch structure in accordance with the embodiments includes at least two ring waveguides located supported over a substrate. The particular optical switch structure also includes at least one PIN diode integral to at least one of the at least two ring waveguides.

A particular optical switch network in accordance with the embodiments includes at least three optical switch structures in accordance with the foregoing particular optical switch structure.

A particular method for fabricating an optical switch structure in accordance with the embodiments includes etching, while using a first photolithographic method, a semiconductor material layer formed over a substrate to provide at least two ring waveguides rising above and integral with a thinned semiconductor material layer formed over the substrate. This particular method also includes patterning, while using a second photolithographic method, the thinned semiconductor material layer to form at least two separate semiconductor material slabs integral to each of which is formed a ring waveguide. This particular method also includes doping at least one of the semiconductor material slabs differentially inside the ring waveguide and outside the ring waveguide to form a PIN diode integral with the ring waveguide.

BRIEF DESCRIPTION OF THE DRAWINGS

The objects, features and advantages of the invention are understood within the context of the Detailed Description of the Embodiments, as set forth below. The Detailed Description of the Embodiments is understood within the context of the accompanying drawings, that form a material part of this application, wherein.

DETAILED DESCRIPTION OF THE EMBODIMENTS

The embodiments include an optical switch structure that may be used in an on-chip optical network, an optical switch network that derives from the optical switch structure and a method for fabricating the optical switch structure that may be used in the on-chip optical network. The foregoing optical switch structure and related method in accordance with the embodiments provides a minimum of two ring waveguide resonant optical cavities located and formed supported over a substrate, where at least one of the ring waveguide resonant optical cavities includes as a tuning component a PIN diode integral to the at least one of the at least two ring waveguide resonant optical cavities. Thus, an optical switch structure in accordance with the embodiments comprises an electro-optical switch that is tuned using a PIN diode that is integral to a ring waveguide resonant optical cavity within the optical switch structure.

The description that follows includes several parts that are sequentially describe: (1) Optical Switch Structure and Electro-Optical Properties; (2) Optical Switch Structure Method of Fabrication; (3) Operational Limits; and (4) Additional Embodiments.

Optical Switch Structure and Electro-Optical Properties

An optical switch structure in accordance with the embodiments includes a minimum of two ring waveguide resonant optical cavities which are electrically isolated, and located and formed integral to a semiconductor slab that includes p-doped and n-doped regions that are separated by an intrinsic region that is integral with at least one ring waveguide within the minimum of two ring waveguides. The at least two ring waveguide resonant optical cavities create a broadband optical transmission pathway, while the integrated PIN diode(s) enable free carrier injection and extraction to change a refractive index of a material (i.e., typically but not exclusively a silicon material, such as but not limited to a monocrystalline silicon material or a polycrystalline silicon material) from which is comprised the ring waveguide resonant optical cavities.

Figure 1:
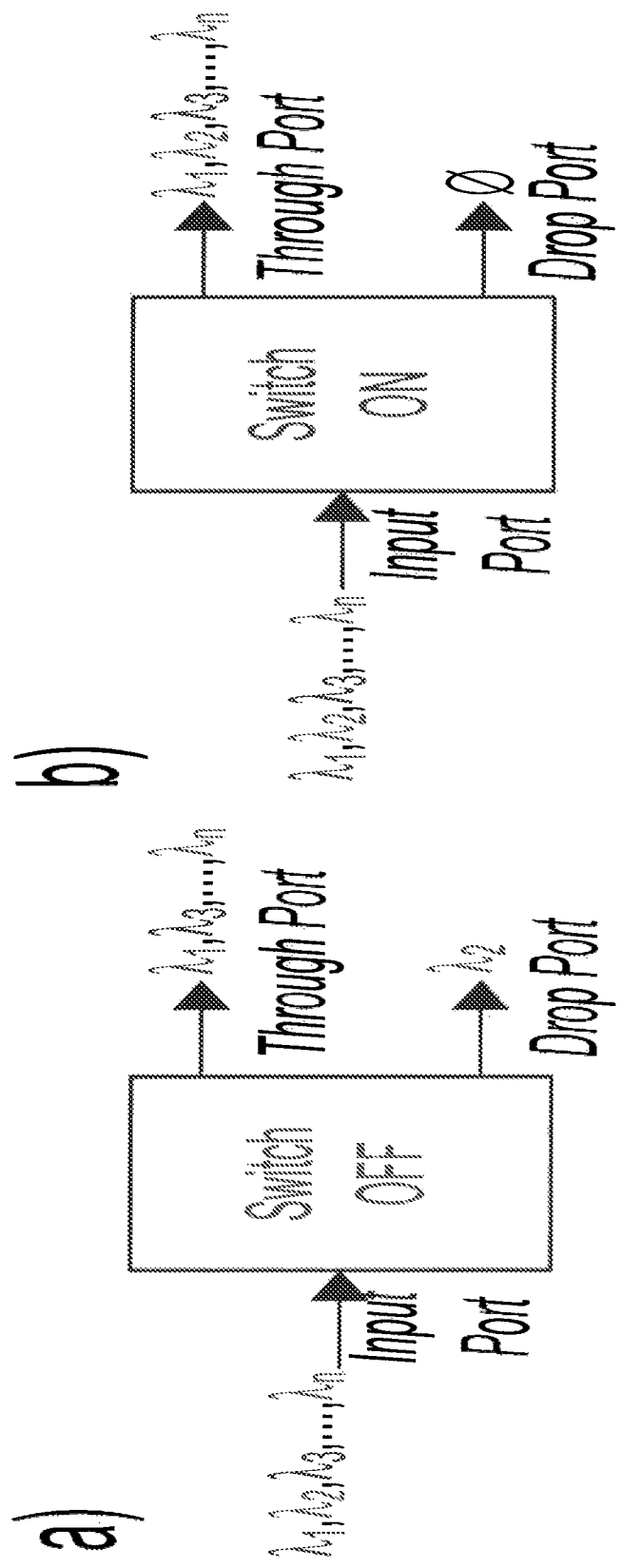
FIG. 1a and FIG. 1b shows a pair of schematic diagrams illustrating the definition of hitless operation of an optical switch device in accordance with the embodiments.
Figure 2:
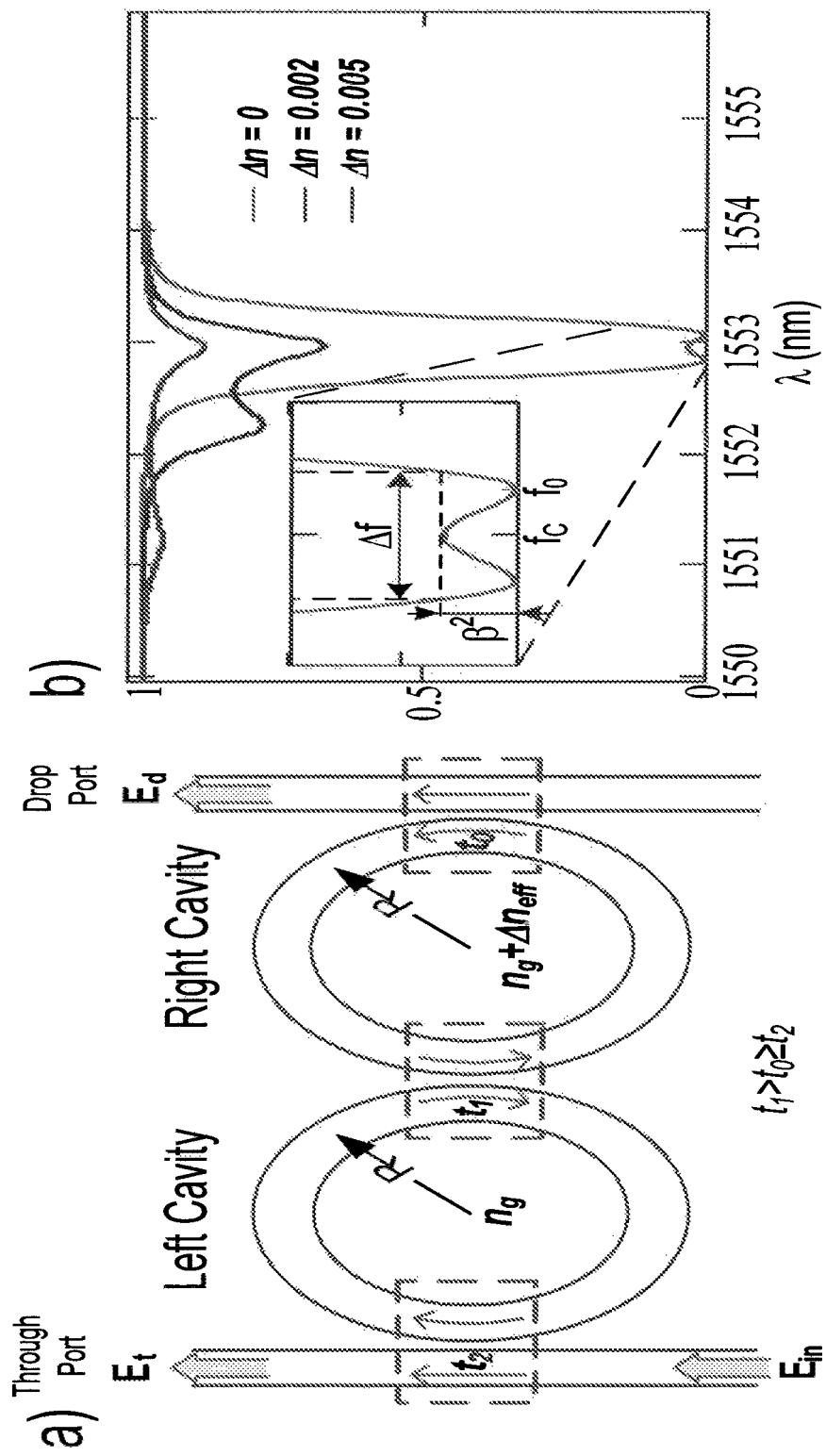
FIG. 2a and FIG. 2b show a schematic diagram and a related graph showing a basic optical switch structure and operation of an optical switch device in accordance with the embodiments.

For reference purposes, FIG. 2a shows a schematic diagram of an optical switch structure in accordance with the embodiments. The optical switch structure in accordance with the embodiments includes, from left to right: (1) a through port strip waveguide (that begins with a through port input port) that is optically coupled with; (2) a left ring waveguide resonant optical cavity that in turn is optically coupled with; (3) a right ring waveguide resonant optical cavity that in turn is optically coupled with; (4) a drop port strip waveguide (that begins with an add port input port).

FIG. 2b shows a reduction of intensity of a particular wavelength optical signal within an optical switch structure in accordance with the embodiments as a function of a change of effective index of refraction of silicon within a silicon ring waveguide resonant optical cavity that comprises the optical switch structure. Thus, within FIG. 2b, the deepest and largest trough at 1553 nm corresponds with no change in index of refraction of the silicon ring waveguide resonant optical cavity (i.e., switch OFF that provides for transfer of an optical signal to a drop port), while the smallest trough at 1553 nm corresponds with the largest 0.006 change in index of refraction of the silicon ring waveguide resonant optical cavity (i.e., switch ON that provides for no transfer of an optical signal to a drop port). The intermediate trough interposed between the largest trough and the smallest trough corresponds with an intermediate 0.002 change in index of refraction of the silicon ring waveguide resonant optical cavity.

Broadband operation of an optical switch in accordance with the embodiments is achieved when: (1) the ring waveguide resonant optical cavities share the same optical resonance wavelength; and (2) an optical resonant coupling between each ring waveguide resonator optical cavity and an adjacent strip waveguide (i.e., a through port strip waveguide or a drop port strip waveguide as is illustrated in FIG. 2a) is much stronger than the optical resonant coupling between adjacent ring waveguide resonant optical cavities. The hitless operation of an optical switch device that derives from the optical switch structure is achieved by changing the resonance of the ring waveguide resonant optical cavity coupled with the drop port strip waveguide, generally, while leaving any other ring waveguide resonant optical cavity (or cavities) unperturbed. When both ring waveguide resonant optical cavities share the same optical resonance conditions, light with frequency within a filter bandwidth is directed to the drop port. When an index of refraction of a material from which is comprised the ring waveguide resonant optical cavity coupled with the drop port (i.e., the right ring waveguide resonant optical cavity in FIG. 2a) is changed, the two ring waveguide resonant optical cavities no longer share the same optical resonance conditions. The foregoing conditions lead to an over-coupled system and an optical signal entering the optical switch structure is not routed to the through port. The observation that the index of refraction of the material from which is comprised the ring waveguide resonant optical cavity coupled to the through port strip waveguide (i.e., the left ring waveguide resonant optical cavity in FIG. 2a) is not changed prevents perturbation of adjacent optical channels within the optical switch structure, thus providing a hitless optical switch.

In order to optimize performance of an optical switch device derived from an optical switch structure in accordance with the embodiments, the following coupling conditions are calculated and considered, i.e., the transmission values for each directional coupler present in the optical switch structure ($t_0$, $t_1$ and $t_2$ in FIG. 2a) as a function of the desired bandwidth ($\Delta f$) given a desired intensity attenuation coefficient $\beta^2$, also known as power ripple, (shown in the insert of FIG. 2b). General methods for filter synthesis when there is no propagation loss have been extensively studied for CROW systems. The embodiments provide the steps for a Chebyshev-like transfer function implementation when losses are considered in a two ring waveguide resonant optical cavity device, by forcing the minimum transmission to be zero and the maximum to be $\beta^2$ inside the bandwidth of the transmission spectrum of the through port.

The equations for the field at the through port and the drop port are:

$$E_t = \frac{t_2 - e^{i\phi_2} a_2 E_{t1}}{1 - t_2 e^{i\phi_2} a_2 E_{t1}} \text{ and } E_d = \frac{\sqrt{e^{i\phi_2} a_2} \cdot (-ik_2) \cdot E_{d1}}{1 - t_2 e^{i\phi_2} a_2 \cdot E_{t1}} \quad (1)$$

with $$E_{t1} = \frac{t_1 - e^{i\phi_1} a_1 t_0}{1 - t_1 e^{i\phi_1} a_1 t_0} \text{ and } E_{d1} = \frac{-\sqrt{e^{i\phi_1} a_1} \cdot (-ik_1) \cdot (-ik_0)}{1 - t_1 e^{i\phi_1} a_1 t_0} \quad (2)$$

and with $$a_i = e^{\frac{\alpha + \Delta \alpha_i}{2} 2\pi R} \text{ and } \phi_i = \frac{2\pi}{\lambda} \cdot (n_g + \Delta n_{eff i}) \cdot 2\pi R \quad (3)$$

where $E_t$ is the field intensity at through port, $E_d$ is the field intensity at drop port, $t_0$, $t_1$ and $t_2$ are the transmission coefficients of the directional couplers shown in FIG. 2a, $k_0$, $k_1$ and $k_2$ are the coupling coefficients of the directional couplers, R is the radius of the rings, $\alpha$ is intrinsic loss, $\Delta\alpha_i$ is the loss caused by free-carrier absorption, $a_i$ is the roundtrip attenuation coefficient for ring i, $n_g$ is the group index of the device, $\Delta n_{eff\,i}$ is the refractive index change caused by free-carrier dispersion for ring i, and $\lambda$ is the free space wavelength. With no free-carrier injection the values for roundtrip attenuation coefficient are equal $a_1=a_2=a$ and phases are also equal 1=2=. The equations are shown in a recursive fashion and can be easily extended for higher order filters, although a matrix analysis method can also be used. Analogous to the condition for critical coupling in a single ring waveguide resonant optical cavity, critical coupling for two ring waveguide resonant optical cavities requires that the transmission in the input waveguide is equal to the product of attenuation coefficients and transmission coefficient of the output waveguide:

$$t_2 = a^2 t_0 \quad (4)$$

Introducing Eq. (4) into the equation for the transmission field $E_t$ and forcing it to have zeros in the numerator one obtains:

$$t_1 = \cos\phi_0 \frac{2a \cdot t_0}{1 + t_0^2 a^2} \quad (5)$$

where $_0$ is the value of the phase that provides zeros in the through port transmission spectrum. Introducing Eq. (4) and Eq. (5) into Eq. (1) and considering that the minimum attenuation allowed inside the bandwidth ($\beta$) happens for =0, the following equation is obtained for $t_0$:

$$(a \cdot t_0)^4 - 2 \frac{(1 - \cos\phi_0)}{\beta \cdot a} (a \cdot t_0)^3 - \frac{(a^2 + 1)(2 \cdot \cos\phi_0 - 1)}{a^2}(a \cdot t_0)^2 - 2\frac{(1-\cos\phi_0)}{\beta \cdot a}(a \cdot t_0) + \frac{1}{a^2} = 0 \quad (6)$$

which can be solved analytically or numerically. One looks for the root with a real value which provides $t_0<1$. Finally, the phase of the transmission zero can be related to bandwidth by:

$$\phi_0 = \frac{2\pi}{2\sqrt{2}} \cdot \frac{\lambda_c^2}{c_0} \frac{\Delta f}{FSR} \quad (7)$$

or $$\phi_0 = \frac{2\pi}{2\sqrt{2}} \cdot \frac{\Delta f}{fsr}$$

where $\lambda_c$ is the central wavelength of the switch, $\Delta f$ is the bandwidth or flat region where the through port transmission is smaller than the ripple ($\beta$), $c_0$ is the light speed at vacuum, FSR is the Free Spectral Range in wavelength domain and fsr is the Free Spectral Range in frequency domain. Therefore, once the values of $\Delta f$, $\beta$ and a are specified, one can determine the transmission for each directional coupler present in the optical switch device. It can be demonstrated from the equations above that, for devices with losses, one can have a box-like transfer function only if the value of $_0$ is greater than a minimum value $_{min}$:

$$\phi_{min} = \frac{2 \cdot (a^4 + a^2) - \beta \cdot (a^6 + a^4 + a^2 + 1)}{2 \cdot (1 - \beta) \cdot (a^4 + a^2)} \quad (8)$$

Optical Switch Structure Method of Fabrication

The fabrication process flow and sequence for an optical switch structure in accordance with the embodiments ensures that the PIN diode tuning structures are electrically isolated for independent tuning of each ring waveguide resonant optical cavity, an important requirement to achieve hitless operation of an optical switch device that derives from the optical switch structure. Optical switch structures in accordance with the embodiments may be fabricated using a silicon-on-insulator (SOI) substrate with a 250 nm device layer located and formed upon a 3 μm buried oxide (BOX) layer. Other substrates are not precluded for fabricating and forming a ring waveguide resonant optical switch structure in accordance with the embodiments. Strip waveguides and ring waveguide resonant optical cavity structures are created by masking and etching 210 nm of the 250 nm top monocrystalline silicon layer within a SOI substrate, leaving a 40 nm slab remaining throughout the chip. The PIN diodes are fabricated by doping the slab regions around each ring waveguide resonant optical cavity. Electrical isolation of each ring waveguide resonant optical cavity and related PIN diode is realized by etching the silicon slab in regions interposed between the ring waveguide resonant optical cavities. A patterned first mask (i.e., such as but not limited to a first hard mask or a first resist mask) that is used for initially etching of the strip waveguides and ring waveguide resonant optical cavities protects those structures in a second etching and patterning step, while an additional patterned second mask (i.e., such as but not limited to a second hard mask or a second resist mask, such as but not limited to a second HSQ resist mask) is used as a second mask for etching and patterning the remaining slab regions. Although only one of the ring waveguide resonant optical cavity optical switch structures requires dynamic tuning, electrical contacts to both ring waveguide resonant optical cavities are created in order to fine tune an optical switch device spectra if needed.

A specific process sequence for fabrication of an optical switch structure in accordance with the foregoing description and embodiments is illustrated in FIG. 9a to FIG. 9h.

Figure 9A:
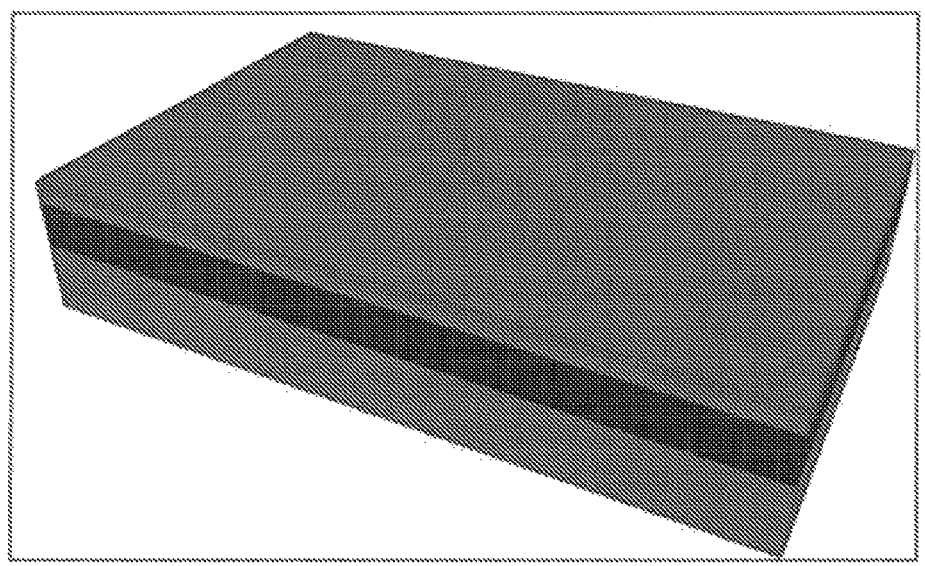
FIG. 9a, FIG. 9b, FIG. 9c, FIG. 9d, FIG. 9e, FIG. 9f, FIG. 9g and FIG. 9h show a series of schematic perspective-view diagrams illustrating the results of progressive stages in fabricating a optical switch structure in accordance with the embodiments.

FIG. 9a shows a silicon-on-insulator (SOI) substrate comprising a base semiconductor substrate 10, a buried oxide layer 12 located and formed upon the base semiconductor substrate 10 and a surface semiconductor layer 14 located and formed upon the buried oxide layer 12. Located and formed upon the surface semiconductor layer 14 within the semiconductor-on-insulator (SOI) substrate is a first mask layer 16 (i.e., that may include, but is not necessarily limited to, a hard mask layer or a resist mask layer).

Figure 9B:
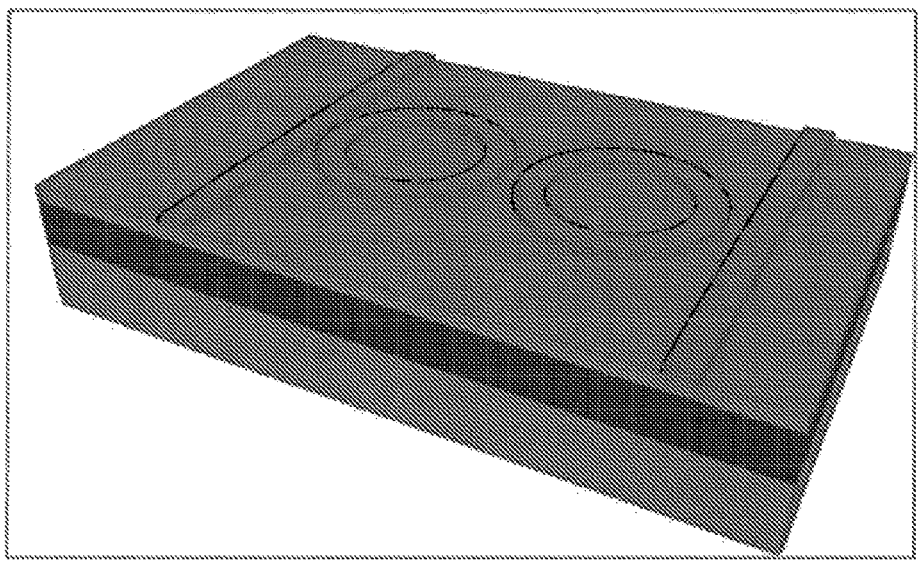

FIG. 9b shows the patterning of the first mask layer 16 to form a patterned first mask layer 16' that defines the location of the strip waveguides (i.e., through port waveguide and drop port waveguide) having interposed there between the plurality of ring waveguide resonant optical cavities.

Figure 9C:
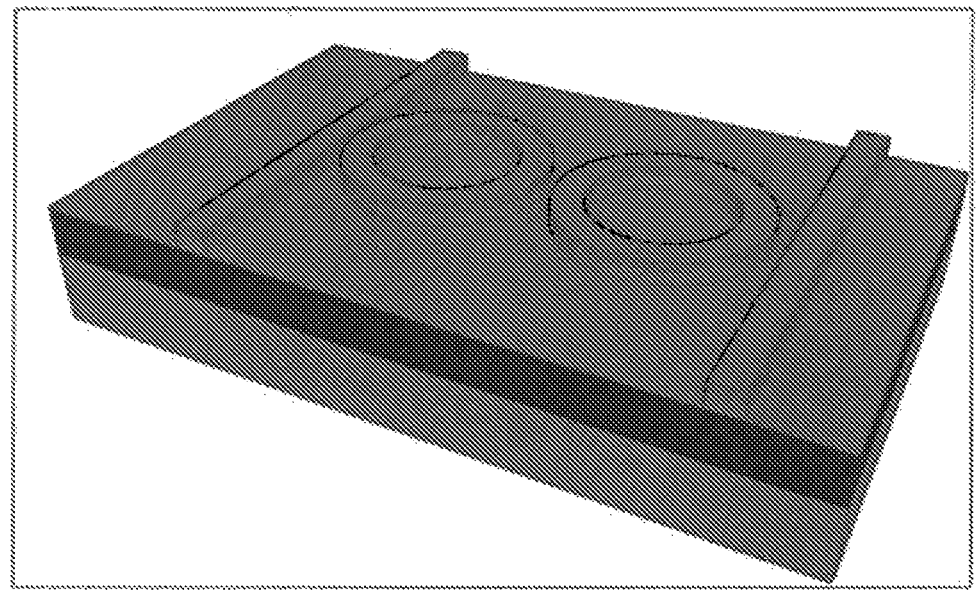

FIG. 9c shows the results of etching the surface semiconductor layer 14 to form an etched surface semiconductor layer 14' while using the patterned first mask layer 16' as an etch mask layer. As is illustrated in FIG. 9c, the surface semiconductor layer 14 is not completely etched (i.e., not completely patterned) when forming the etched surface semiconductor layer 14', but rather a remainder portion of about 40 nm thickness of the initial 250 nm thickness of the surface semiconductor layer 14 remains in unmasked portions to yield the strip waveguides and the ring waveguide resonant optical cavities elevated by a thickness of about 210 nm above and contiguous with a silicon semiconductor slab that covers entirely the buried oxide layer 12.

Figure 9D:
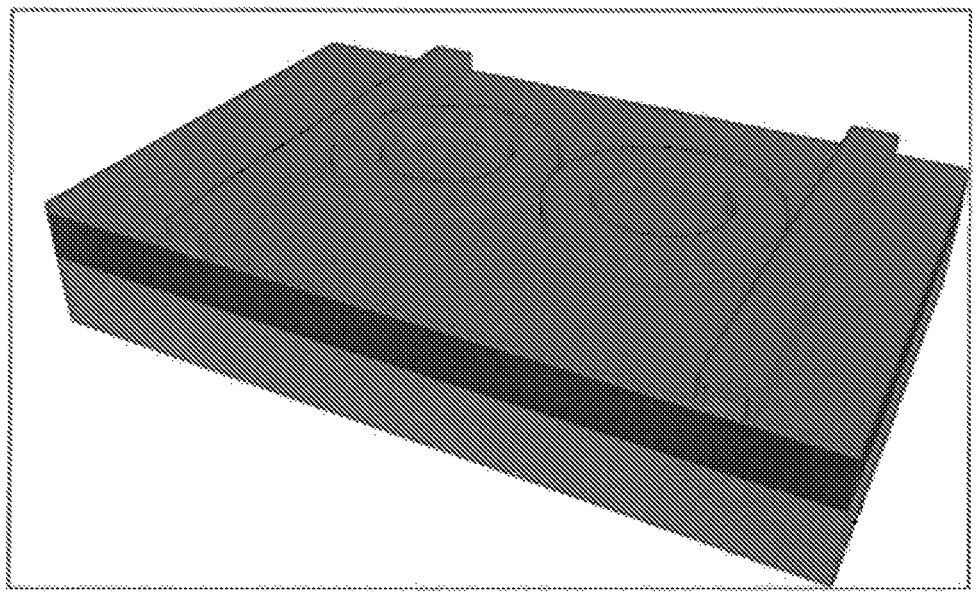

FIG. 9d shows a second mask layer 18 located and formed upon the optical switch structure of FIG. 9c. This second mask layer 18 is located and formed upon the optical switch structure of FIG. 9d without removing the patterned first mask layer 16'. This second mask layer 18 may also comprise any of several mask materials, including but not limited to hard mask materials and resist mask materials. As is understood by a person skilled in the art, if both the first mask layer 16 and the second mask layer 18 comprise resist mask materials, consideration is given to selection of a corresponding first resist material and a corresponding second rest material so that the patterned first mask layer 16' is stable with respect to a patterned second mask layer that is formed from the second mask layer 18. Normally, such consideration may require that the first resist material comprise a negative resist material.

Figure 9E:
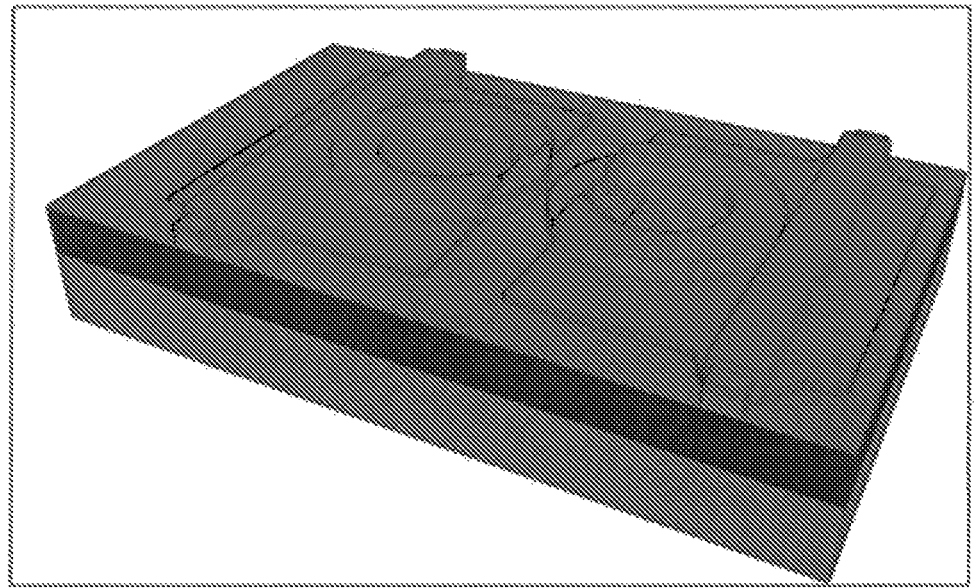

FIG. 9(e) shows the results of exposing and developing the second mask layer 18 to form a patterned second mask layer 18'. The patterned second mask layer 18' is intended to cover most portions of the strip waveguides and the ring waveguide resonant optical cavities, but also to leave exposed: (1) a moat region surrounding an individual strip waveguide and an adjacent ring waveguide resonant optical cavity; and (2) a slab portion of the surface semiconductor layer 14' interior to and most closely adjacent an adjacent ring waveguide resonant optical cavity.

Figure 9F:
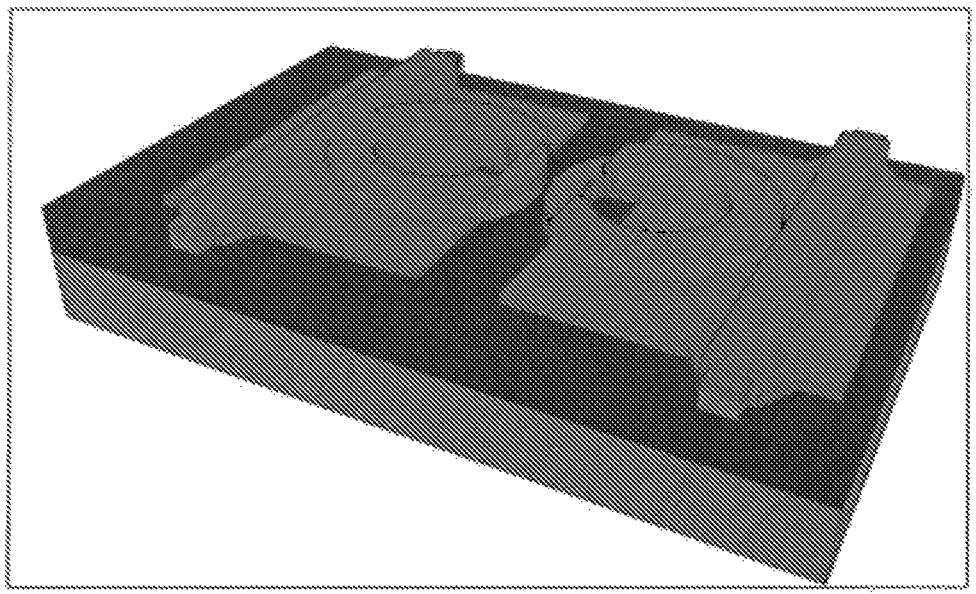

FIG. 9(f) shows the results of a second etching of the surface semiconductor layer 14' to provide patterned surface semiconductor layers 14", while using the patterned second mask layer 18' and the patterned first mask layer 16' as an etch mask layer. This particular etching provides patterned surface semiconductor layers 14" that are separated and isolated from each other, where each one of the separated and isolated patterned surface semiconductor layer 14" (i.e., semiconductor material layer slabs) includes integral thereto and rising there above one strip waveguide and one ring waveguide resonant optical cavity.

Figure 9G:
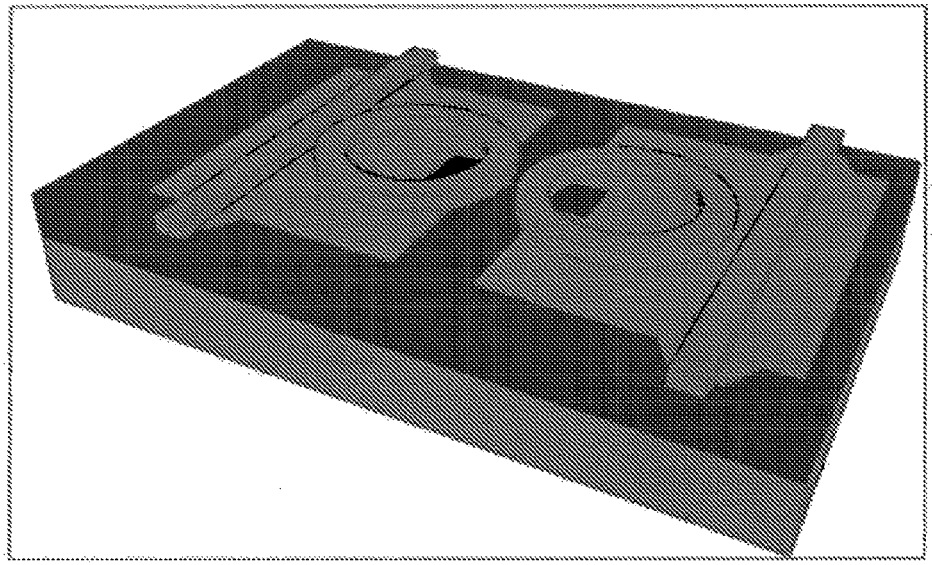

FIG. 9g shows the results of stripping the patterned second mask layer 18' and the patterned first mask layer 16' from the optical switch structure of FIG. 9f.

Figure 9H:
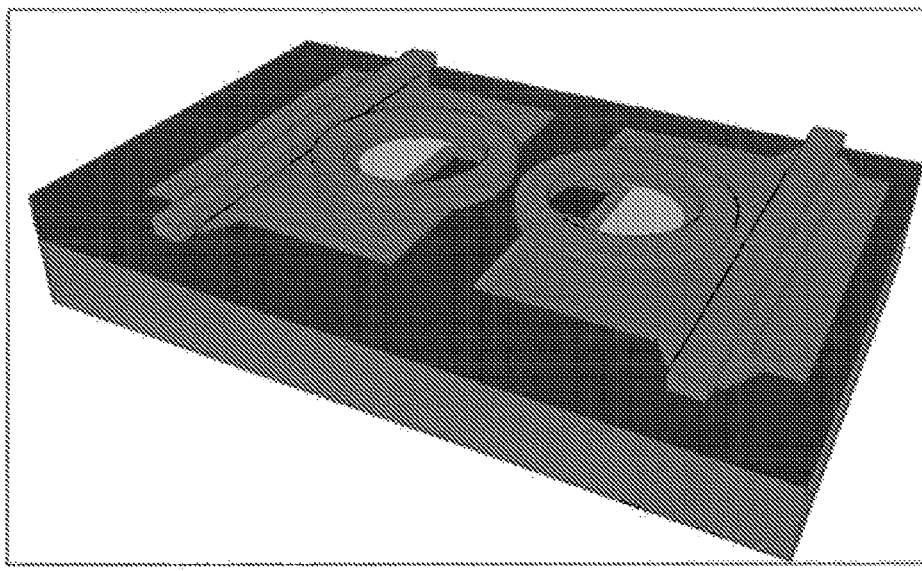

FIG. 9h shows the results of doping (i.e., via ion implantation to yield a concentration of about 10e19 dopant atoms per cubic centimeter): (1) portions of the semiconductor slabs interior to the ring waveguide resonant optical cavities to form first doped regions 20; and (2) portions of the semiconductor slabs exterior to the ring waveguide resonant optical cavities to form second doped regions 22 of conductivity type different (and generally opposite) to the first doped regions 20. Interposed between the first doped regions 20 and the second doped regions 22 are intrinsic undoped regions of the patterned surface semiconductor layers 14" that include the ring waveguide resonant optical cavities, that form a PIN diode in conjunction with the first doped regions 20 and the second doped regions 22. As is illustrated in FIG. 9h, the first doped regions 20 do not reach an interior sidewall of a ring waveguide resonant optical cavity and the second doped regions 22 do not reach an exterior sidewall of the ring waveguide resonant optical cavity, but rather are separated by a distance from about 0.2 to about 0.4 microns so as not to interfere with resonant optical coupling within a ring waveguide resonant optical cavity. Similarly, a notch (having an edge distance from about 2.5 to about 3.0 microns and a penetration distance from about 2.0 to about 2.5 microns) in each patterned surface semiconductor layer 14" interior to each ring waveguide resonant optical cavity at the point at which each ring waveguide resonant optical cavity is most closely adjacent also provides for enhanced optical switching fidelity and decreased optical noise due to electrical crosstalk within the optical switch structure whose schematic perspective view diagram is illustrated in FIG. 9h.

As is further understood by a person skilled in the art, further processing of the optical switch structure whose schematic perspective view diagram is illustrated in FIG. 9h will generally include passivation cladding as discussed above (i.e., such as but not limited to silicon oxide passivation cladding), as well as etching of vias and forming metallization contacts to the first doped regions 20 and the second doped regions 22 that provide for tuning of an optical switch device that derives from the optical switch structure through electrical activation of the PIN diode.

Restricting a silicon semiconductor slab to include primarily a strip waveguide and a ring waveguide resonant optical cavity improves both optical coupling at the tapered chip input and propagation losses through the waveguides. The quasi-TM propagation mode is chosen for the embodiments since such a mode has lower dependence on sidewall roughness as compared to the quasi-TE mode, usually providing a cleaner spectrum. The shape of the optical switch structure was designed to be equivalent to a racetrack in the region where a strong coupling is required and equivalent to a ring in the coupling region where the coupling is weak, therefore allowing waveguides to be placed further apart and reducing mode conversion losses. Thus, a ring waveguide resonant optical cavity in accordance with the embodiments is not necessarily specifically limited to a perfect ring structure, but rather may include, but is not necessarily limited to, ring structures, racetrack structures, other enclosed curved structures and the like. For an optical switch device with power ripple of 17.5 dB below the transmission bandwidth of 60 GHz and losses about 10 dB/cm, obtained were coupling parameters $t_0=0.811$, $t_1=0.970$ and $t_2=0.800$ which were achieved using spacings of 304 nm, 350 nm and 300 nm, and linear region lengths of 3797 nm, 673 nm and 3797 nm, respectively.

Figure 3:
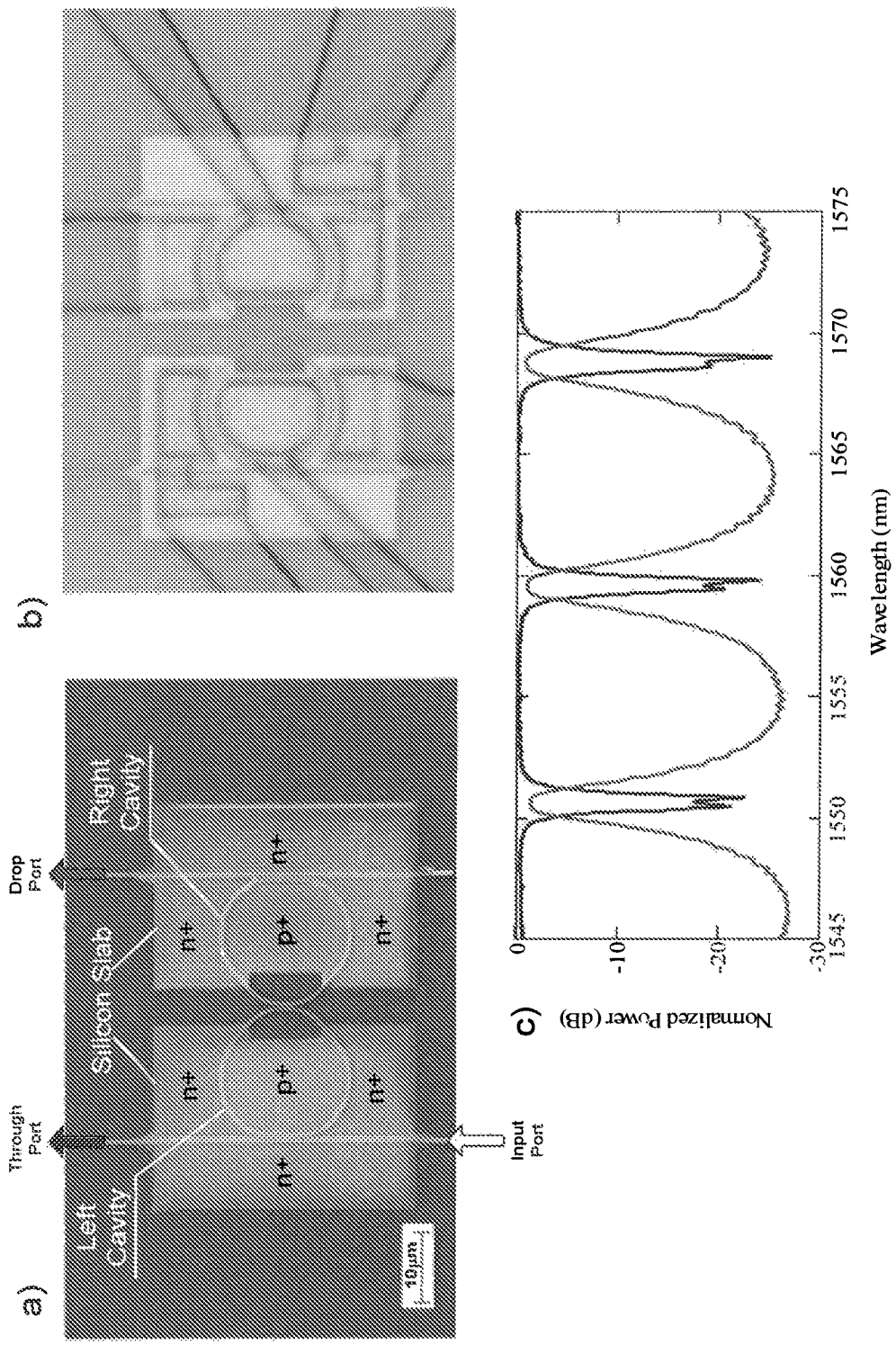
FIG. 3a, FIG. 3b and FIG. 3c show a plurality of diagrams of structural features (FIG. 3a and FIG. 3b) of an optical switch structure in accordance with the embodiments, as well as optical features (FIG. 3c) of an optical switch device in accordance with the embodiments.

FIG. 3a shows a SEM image of an optical switch structure in accordance with the embodiments with $p^+$ (internal to ring waveguide resonant optical cavities) and $n^+$ (external to ring waveguide resonant optical cavities) implanted doped regions as designated. The monocrystalline silicon strip waveguides and ring waveguide resonant optical cavities have 250 nm×450 nm cross-section. The resulting optical switch structure device is cladded with 1 μm of silicon dioxide and has a 3 μm silicon dioxide BOX. Each ring waveguide resonant optical cavity has a total length 2π·10 μm with 8 μm bend radius. The ring waveguide resonant optical cavities are separated by a distance of about 0.35 microns at minimum, and each ring waveguide resonant optical cavity is separated from a strip waveguide by a distance of about 0.3 microns.

FIG. 3b shows an optical microscope image of the optical switch structure before processing to yield metallization (i.e., such as but not limited to aluminum) contact pads.

FIG. 3c shows a switching spectrum of the fabricated optical switch device without any carrier injection. The upper curve illustrates power at a through port as a function of wavelength, while the lower curve illustrates power at a drop port as a function of wavelength.

Figure 4:
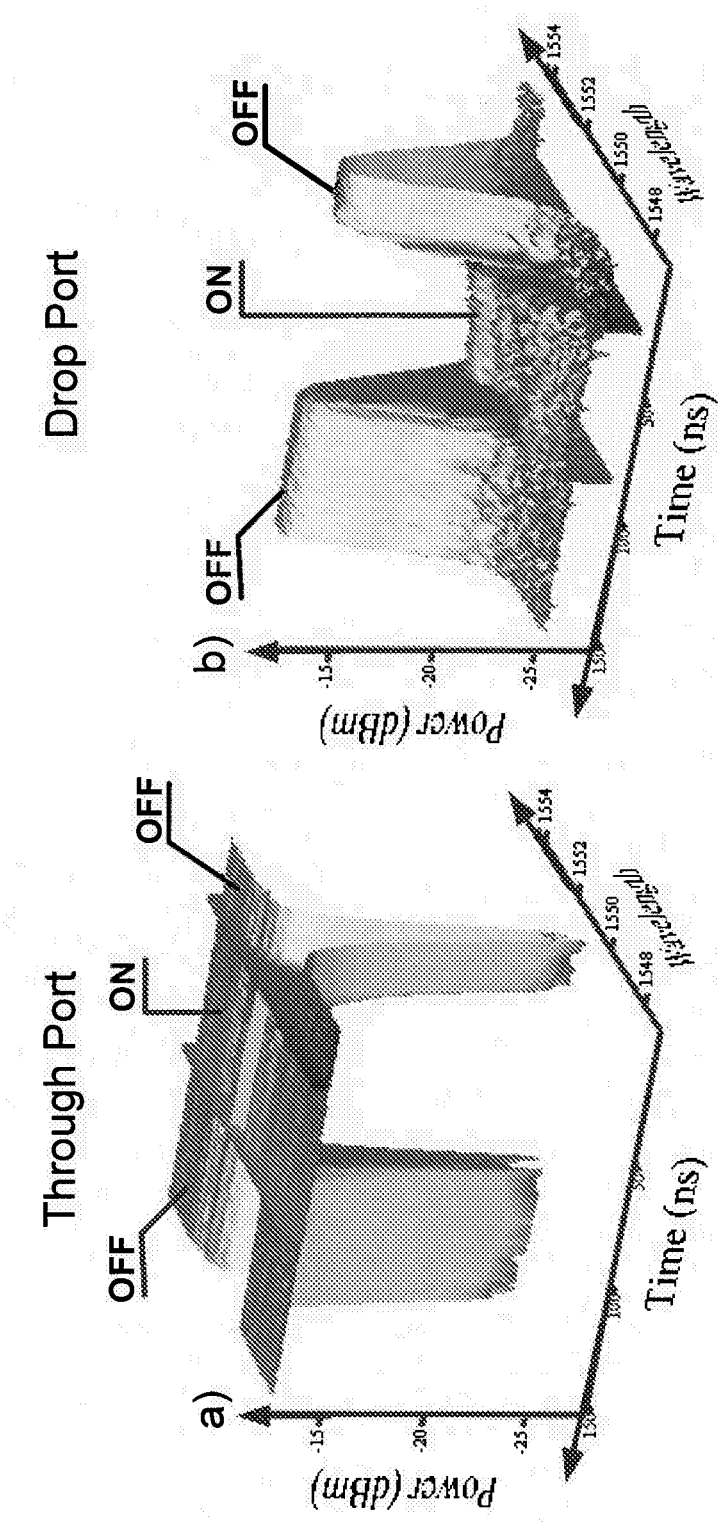
FIG. 4a and FIG. 4b show a pair of three dimensional diagrams illustrating optical switching characteristics of an optical switch device in accordance with the embodiments.

Broadband hitless switching behavior was demonstrated by measuring the dynamics of the foregoing switching spectrum as the optical switch was turned ON and OFF. The output power at the through port and drop port was monitored during both carrier injection and extraction on an oscilloscope with a 30 GHz bandwidth optical sampling module. Input laser radiation was scanned from 1547.3 nm to 1554.3 nm with steps of 0.05 nm. Particular spectral dynamics for switching are illustrated in FIG. 4a (for through port) and FIG. 4b (for drop port).

The switching times of the optical switch device, free-carrier concentration and amount of refractive index change were obtained by fitting the measured data to a theoretical model. The optical switch device behavior was simulated by introducing the refractive index change and losses in the transfer function equations of the optical switch device (i.e., Eqs. (1) to (3)). In order to obtain the relation between refractive index change and current applied, a DC experiment was performed to separate the blue shift in the resonance, given by free-carrier concentration, from the slow red shift provided by thermal effect. The influences of the temperature and carrier concentration on the device performance are distinguishable when a DC bias is applied by approximating the carrier concentration as directly proportional to the current and the device temperature as proportional to the power dissipated (or the current squared):

$$\Delta n_{eff} = -c_1 I + c_2 I^2, \qquad (9)$$

where $\Delta n_{eff}$ is the change in effective refractive index, and $c_1$ and $c_2$ are proportionality constants. In order to measure the resonance shift carefully, a DC voltage was applied to the cavity coupled to the input waveguide, and both the maximum resonance shift ($\Delta\lambda_{DCmax}$) and the current that provides this shift ($I_{DCmax}$) were measured. Using the relationship $\Delta n_{eff}/n_g = \Delta\lambda/\lambda$, Eq. 9 becomes:

$$\Delta n_{eff} = -[2n_g/\lambda]\cdot[\Delta\lambda_{DCmax}/I_{max}]\cdot I + [n_g\lambda]\cdot[\Delta\lambda_{max}/I_{max}^2]\cdot I^2, \qquad (10)$$

where $n_g$ is the group index and $\lambda$ is the original resonance wavelength. Eq. 10 provides a direct relation between index change and current flowing through the device, from which the free carrier concentration as a function of the current was obtained. This procedure allows one to identify the term with $I^2$ dependence and suppress it from the model simulated for device operation much faster than the time constants of the thermal effect. The free-carrier concentration inside the device was extracted from the free-carrier concentration index change ($\Delta n_{Si}$) and free-carrier absorption losses ($\Delta\alpha$) dependence of silicon, given by:

$$n_{Si} = -8.8\times10^{-22}N - 8.5\times10^{-18}P^{0.8}, [N]=[P]=cm^{-3} \qquad (11)$$

$$\Delta\alpha = 8.5\times10^{-18}N + 6.0\times10^{-18}P, [\Delta\alpha]=cm^{-1} \qquad (12)$$

where $\Delta n_{Si}$ is the index change of the silicon waveguide for a given concentration of electrons (N) and holes (P). The index change in the silicon was related to the overall index change, by the confinement factor (Γ) of the field, which in this particular embodiment is Γ=0.81. Once $\Delta n_{Si}$ is known and N=P in the steady state, one may obtain the free carrier concentration as a function of the current. The losses added to the right cavity ($\Delta\alpha$) are obtained from the Eq. 12, which closes the set of variables used in the modeling.

Figure 5:
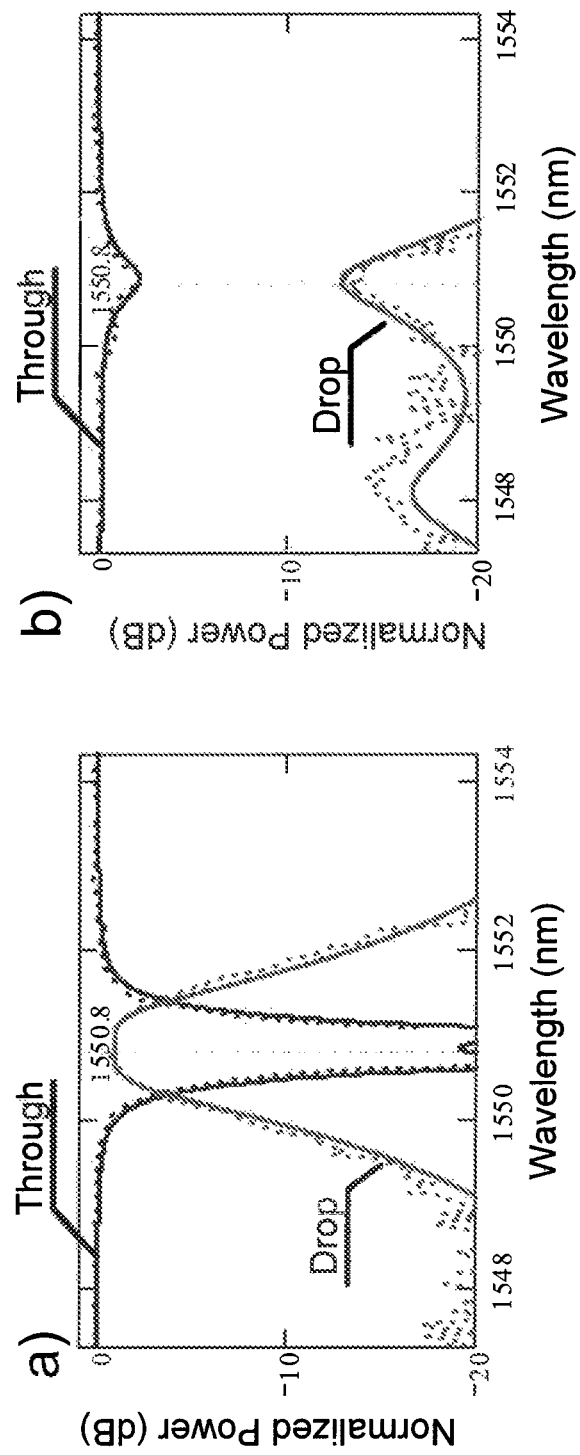
FIG. 5a and FIG. 5b show a pair of two dimensional diagrams illustrating optical switching characteristics of an optical switch device in accordance with the embodiments.
Figure 6:
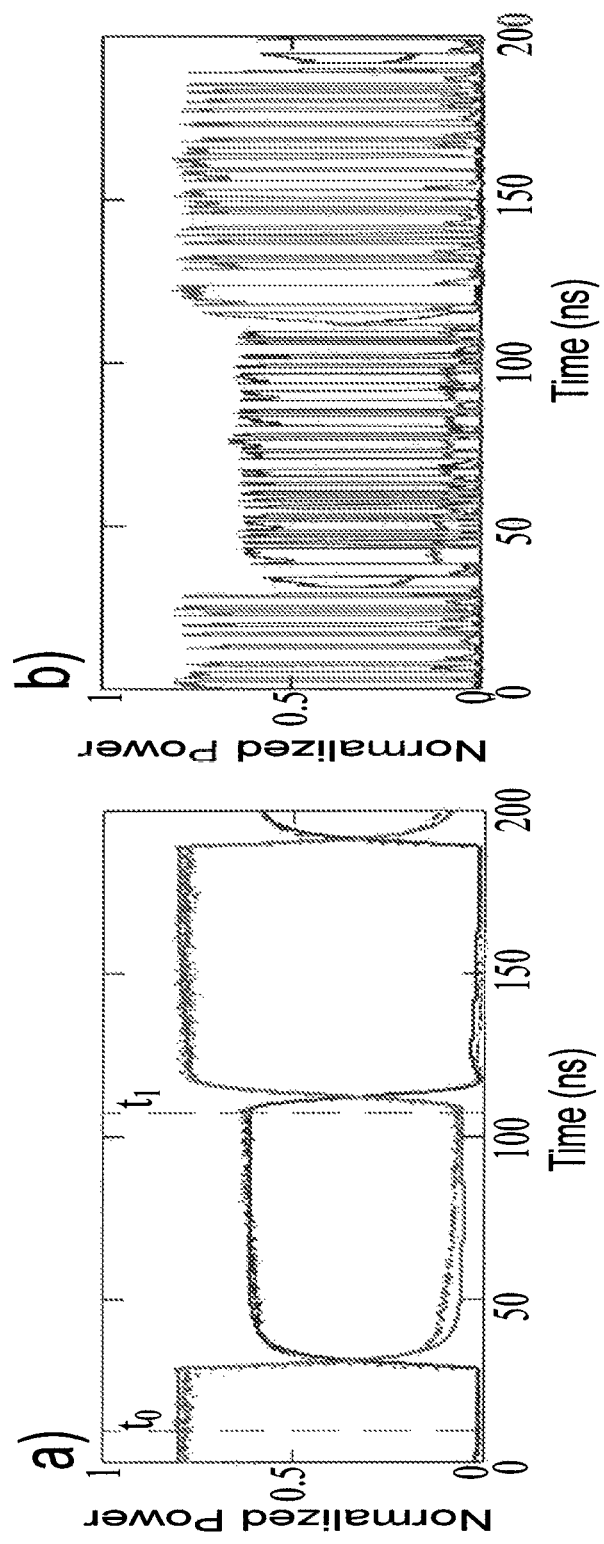
FIG. 6a and FIG. 6b show a pair of time domain response diagrams illustrating optical switching characteristics of an optical switch device in accordance with the embodiments.

Shown in FIG. 5a and FIG. 5b are simulated (continuous lines) and measured (dotted lines) spectrum and time response for the through and drop ports. The drop port transmission changes by 9.8 dB when the switch is turned ON with a 1.46 V bias and 4.0 Vpp switching signal. The through port transmission has an ON/OFF ratio of 16.6 dB. When the device is ON, the right ring waveguide resonant optical cavity has a 2.8 nm resonance shift meaning an index change $\Delta n_{eff} = 0.009$ and a free carrier density around $3.6\times10^{18}$ cm$^{-3}$. The contact resistance of the device is $R_s = 437\Omega$ and the power consumed in ON state considering a 0.7 V junction potential is 17.4 mW. The time domain signal for a single wavelength at 1550.8 nm is shown in FIG. 6a. In FIG. 6b is shown the result of switching a 1 Gbps modulated signal with central wavelength 1550.8 nm. In both FIG. 6a and FIG. 6b, the through port signal is predominant at about 50 to 100 nanoseconds.

Figure 7:
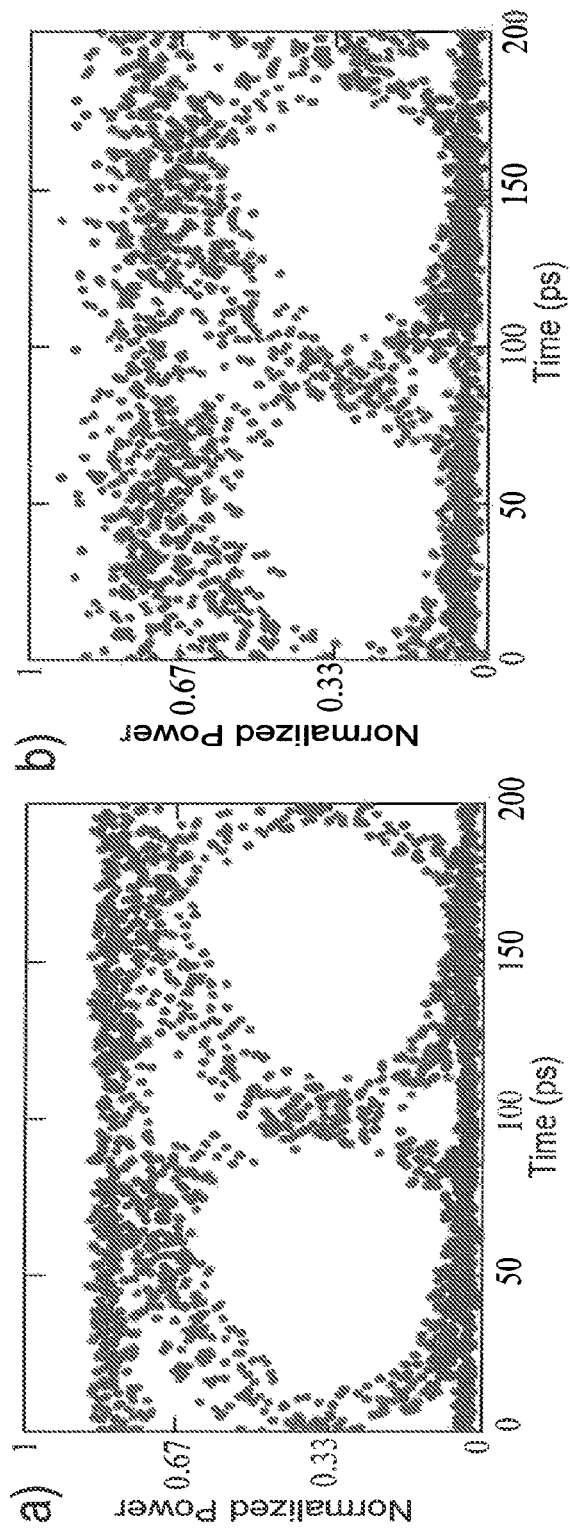
FIG. 7a and FIG. 7b show a pair of eye diagrams illustrating optical switching characteristics of an optical switch device in accordance with the embodiments.

FIG. 7a shows an eye diagram of a 10 Gbps signal input. FIG. 7b shows an eye diagram of the same signal at the drop port. One observes that the 60 GHz bandwidth accommodates the 10 Gbps signal with low distortion. By fitting the simulated curve to the experimental results when a DC voltage is applied one may estimate $\Delta\lambda_{DCmax}=0.8$ nm with $I_{DCmax}=2.0$ mA. Introducing these values in Eq. 10 and considering that the thermal effect is negligible for the dynamics of the system one may obtain, for a 1/e amplitude decay, the time constants for the switch as 7 ns for OFF-ON transition and 3 ns for ON-OFF transition.

Operational Limits

The extinction ratio experienced by each port when the switch goes from OFF state to ON state is limited by the maximum current that a PIN diode can tolerate. Destructive experiments with the fabricated PIN diodes showed that DC currents around 7 mA can damage them, limiting the detuning that can be provided for an optical switch device in accordance with the embodiments. For a ring waveguide resonant optical cavity in accordance with the embodiments, the maximum optical detuning needed for maximum extinction ratio is $$\Delta n_{MAX} = \frac{\lambda}{4\pi R}. \qquad (13)$$

For this amount of refractive index change, the detuned ring waveguide resonant optical cavity needs to have its resonance shifted by half FSR of the device, which corresponds to 4.5 nm for the optical switch device embodied and demonstrated here. To avoid damaging the optical switch device, one may limit the current to 6.3 mA and obtain at most a 2.8 nm detuning. Even though 2.8 nm detuning is only 62% of the maximum detuning, its effect in the ON/OFF ratio is much stronger: for the drop port, the 9.8 dB ON/OFF ratio obtained experimentally represents 79% of the theoretical value for maximum detuning; for the through port, the 16.6 dB ON/OFF ratio obtained experimentally represents 98% of the theoretical value for the maximum detuning. Both values agree with the theoretical result for a 2.8 nm detuning, which also shows that reasonable ON/OFF ratios can be obtained much before the maximum detuning is achieved.

Figure 8:
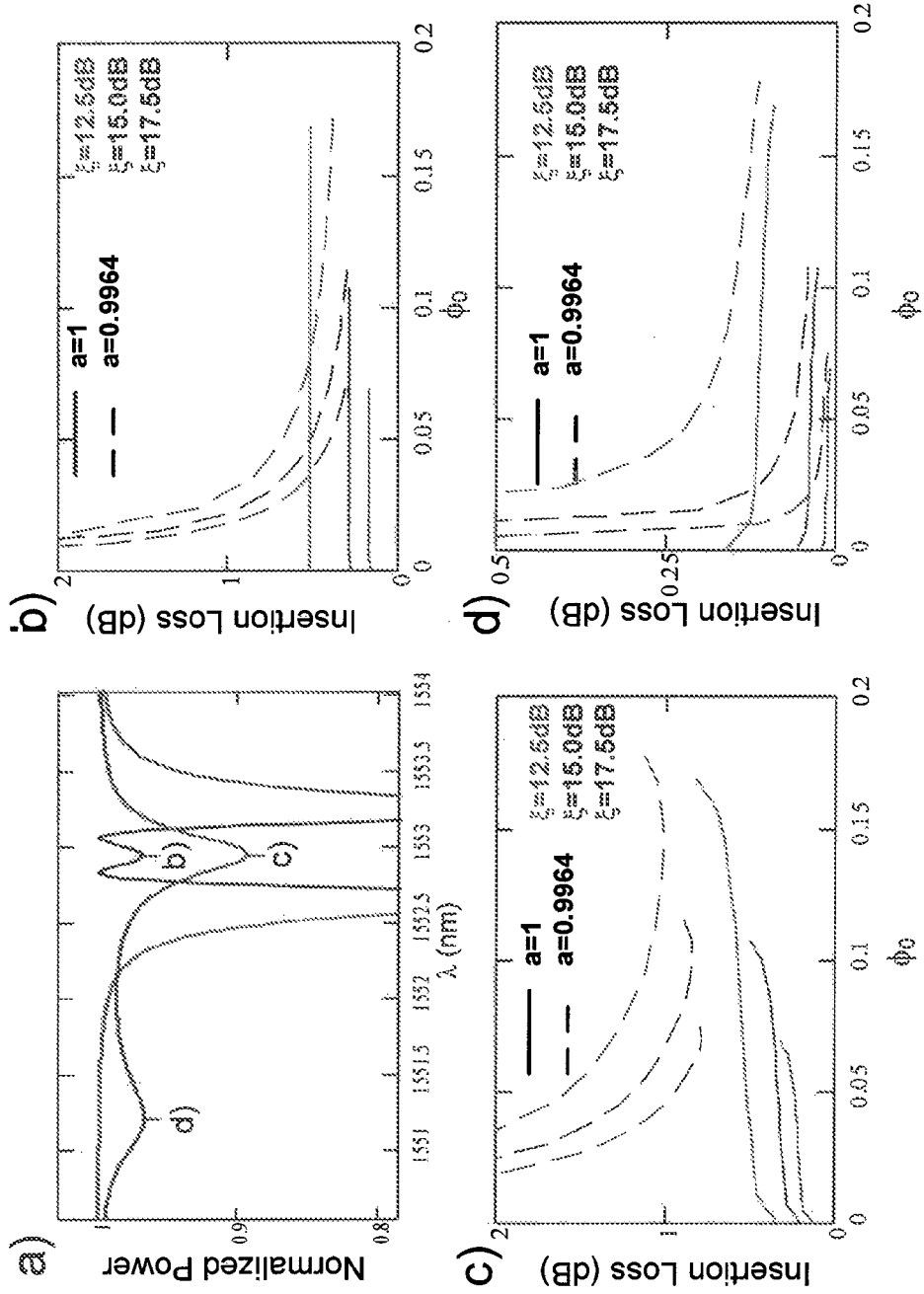
FIG. 8a, FIG. 8b, FIG. 8c and FIG. 8d show a power versus wavelength diagram (FIG. 8a) and a series of insertion loss diagrams (FIG. 8b, FIG. 8c and FIG. 8d) derived from the power versus wavelength diagram, for an optical switch device in accordance with the embodiments.

The insertion loss for this switch topology was considered for drop ports and through ports in three main points: (1) the central wavelength in the drop port when the switch is OFF; (2) the central wavelength in the through port when the switch is ON; and (3) the detuned wavelength in the through port when the switch is ON. FIG. 8a shows the spectrum of insertion losses analyzed for insertion losses of the optical switch in accordance with the embodiments as a function of the normalized bandwidth ($_o$) for a few ripple ($\xi$) and roundtrip loss (a) specifications. FIG. 8b, FIG. 8c and FIG. 8d derive from FIG. 8a. Ripples of 12.5, 15.0 and 17.5 dB are shown from top to bottom for a=1 and from right to left for a=0.9964 in FIG. 8b, FIG. 8c and FIG. 8d.

Additional Embodiments

Figure 10A:
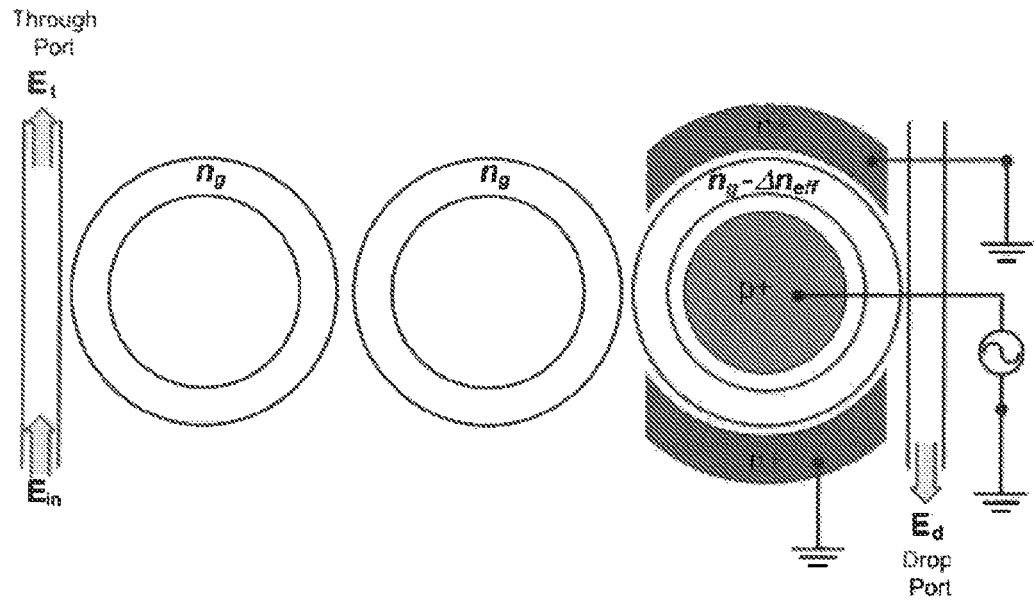
FIG. 10a and FIG. 10b show a pair of diagrams illustrating alternative embodiments of an optical switch structure in accordance with the embodiments.
Figure 10B:
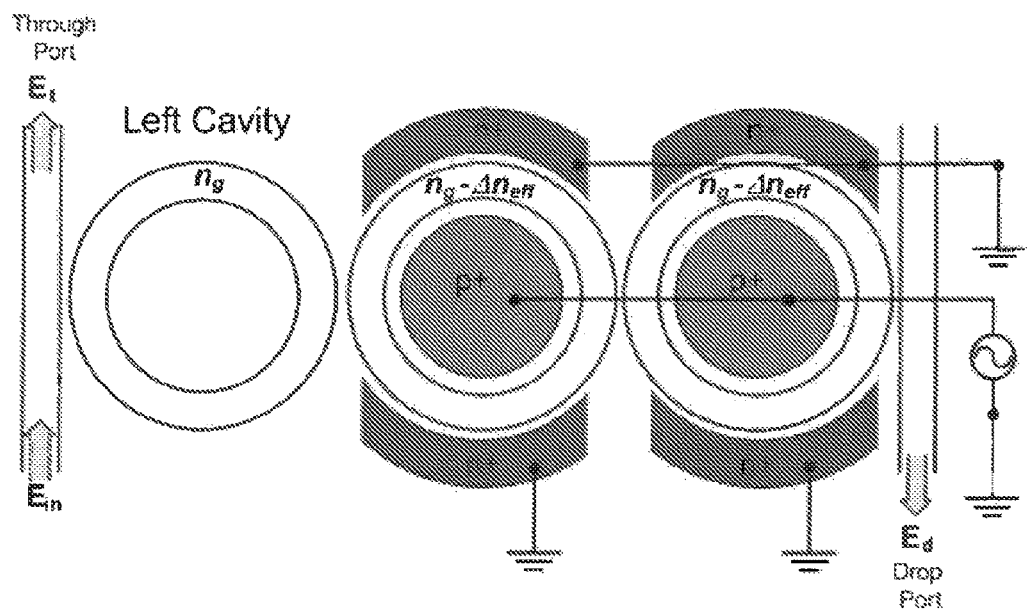

FIG. 10a and FIG. 10b show additional embodiments of an optical switch structure that utilize three ring waveguide resonant optical cavities rather than two ring waveguide resonant optical cavities. As is illustrated in-part in FIG. 10a and FIG. 10b, at least one, possibly two, or even three of the three ring waveguide resonant optical cavities may include an integral PIN diode for resonant tuning (or detuning) of an optical switch device that derives from the optical switch structure via charge injection.

Figure 11:
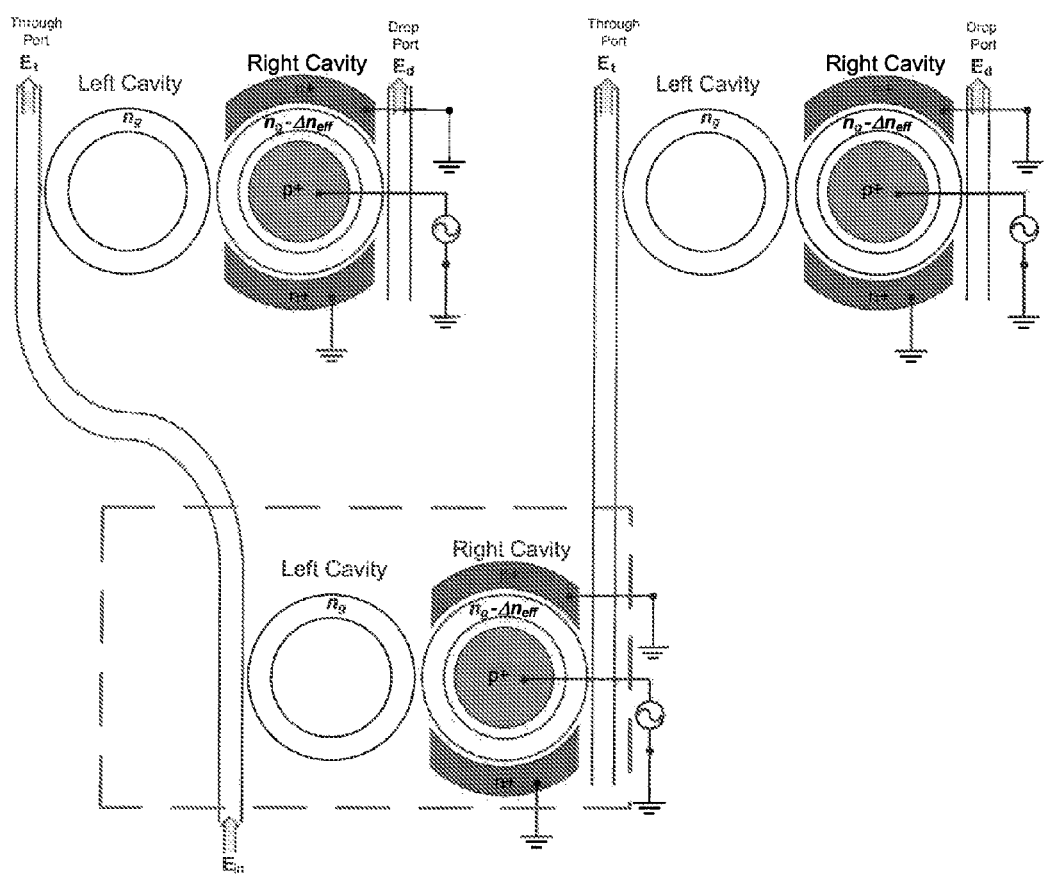
FIG. 11 shows a schematic diagram illustrating a cascading arrangement of multiple optical switch structures in accordance with an additional alternative embodiment.

FIG. 11 shows a cascaded switching structure network assembly that may be designed and fabricated using the basic two ring waveguide resonant optical cavity optical switch structure in accordance with the embodiments. As is illustrated in FIG. 11, a through port of a first optical switch structure in accordance with the embodiments serves as an input port for a second optical switch structure and a drop port of the first optical switch structure serves as an input port for a third optical switch structure in accordance with the embodiments.

Figure 12:
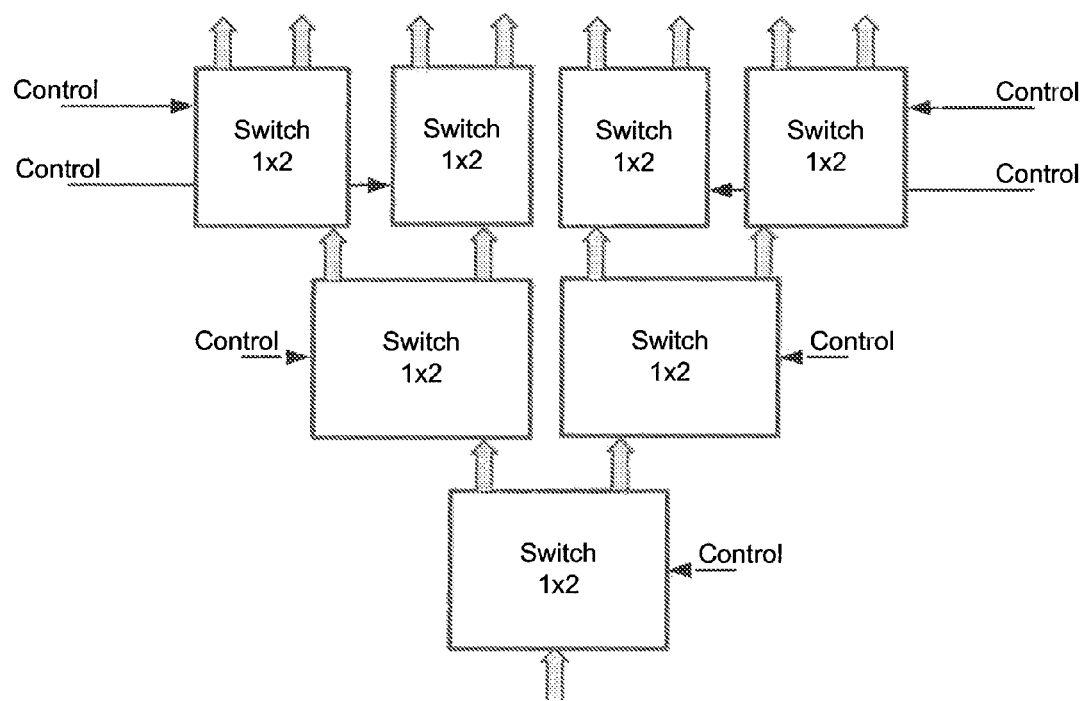
FIG. 12 shows a schematic diagram illustrating a further cascading arrangement of multiple optical switch structures in accordance with another additional alternative embodiment.

Finally, FIG. 12 shows a schematic diagram of the cascading optical switch structure network in accordance with FIG. 11, which is further expanded in a pyramidal fashion to include a third (i.e., upper) level of optical switch structures in accordance with the embodiments.

In summary, the characteristics of a broadband (60 GHz), spectrally hitless, compact (20 μm×40 μm), fast (7 ns) electro-optical switch are described above. The optical switch comprises at least two coupled ring waveguide resonant optical cavities, has independently addressable PIN diodes, and the hitless behavior may be effected when only the ring waveguide resonant optical cavity coupled with a drop port is detuned by free-carrier injection into a PIN diode. Thermal effects in the optical switch device limit the hold time to about 80 ns, and the fabricated optical switch device shows an ON/OFF extinction ratio of 9.8 dB for the drop port and 16.6 dB for the through port when driven by a 1.46 V bias and 4.0 Vpp switching signal, with total power consumption of 17.4 mW.

The foregoing embodiments are illustrative of the invention rather than limiting of the invention. Revisions and modifications may be made to materials, structures and dimensions of an optical switch structure and related method in accordance with the foregoing embodiments while still providing an optical switch structure, an optical switch network and related method in accordance with the invention, further in accordance with the accompanying claims.

What is claimed is:

1. An optical switch structure, comprising:
   at least two ring waveguides disposed supported over a substrate; and
   at least one PIN diode integral to at least one of the at least two ring waveguides, wherein each of the at least two ring waveguides is disposed upon and contiguous with a separated slab of a semiconductor material also disposed and supported over the substrate.

2. The optical switch structure of claim 1 wherein the substrate comprises a silicon-on-insulator semiconductor substrate.

3. The optical switch structure of claim 1, wherein the PIN diode includes disposed within the semiconductor material:
   a first doped region of a first type inside the ring waveguide;
   a second doped region of a second type different than the first type outside the ring waveguide; and
   an intrinsic region interposed between the first doped region and the second doped region.

4. The optical switch structure of claim 3, wherein:
   the first doped region does not extend to an inner sidewall of the ring waveguide;
   the second doped region does not extend to the outer sidewall of the ring waveguide; and
   the intrinsic region includes the ring waveguide.

5. The optical switch structure of claim 4, wherein:
   the semiconductor material comprises a silicon semiconductor material;
   the first doped region comprises a p doped region; and
   the second doped region comprises an n doped region.

6. The optical switch structure of claim 1, wherein the semiconductor material comprises a monocrystalline semiconductor material.

7. The optical switch structure of claim 1, wherein the semiconductor material comprises a polycrystalline semiconductor material.

8. The optical switch structure of claim 1, wherein each of the separated semiconductor slabs is located upon a dielectric layer.

9. The optical switch structure of claim 1, wherein each of the separated semiconductor slabs includes a notch therein at a location where the at least two ring waveguides are most closely adjacent such that a portion of the ring waveguides that are most closely adjacent are not located upon the separated semiconductor slabs.

10. The optical switch structure of claim 1, wherein the optical switch structure comprises at least three ring waveguides.

11. An optical switch network comprising at least three optical switch structures in accordance with claim 1.

12. The optical switch network of claim 11, wherein:
   a through port of a first optical switch structure is connected to an input port of a second optical switch structure; and
   a drop port of the first optical switch structure is connected to an input port of a third optical switch structure.

* * * * *